US010351690B2

(12) United States Patent
Bardin et al.

(10) Patent No.: US 10,351,690 B2
(45) Date of Patent: Jul. 16, 2019

(54) PLASTICISER FOR SEALANTS, PLASTISOLS AND ADHESIVES

(71) Applicant: TOTAL MARKETING SERVICES, Puteaux (FR)

(72) Inventors: Franck Bardin, Chambourcy (FR); Thorsten Bauer, Osnabruck (DE)

(73) Assignee: Total Marketing Services, Puteaux (FR)

( * ) Notice: Subject to any disclaimer, the term of this patent is extended or adjusted under 35 U.S.C. 154(b) by 0 days.

(21) Appl. No.: 15/021,056

(22) PCT Filed: Sep. 9, 2014

(86) PCT No.: PCT/EP2014/069160
§ 371 (c)(1),
(2) Date: Mar. 10, 2016

(87) PCT Pub. No.: WO2015/036389
PCT Pub. Date: Mar. 19, 2015

(65) Prior Publication Data
US 2016/0222188 A1 Aug. 4, 2016

(30) Foreign Application Priority Data
Sep. 11, 2013 (FR) .................... 13 58730

(51) Int. Cl.
*C08K 5/01* (2006.01)
*C09D 5/34* (2006.01)
*C08K 5/101* (2006.01)
*C08G 65/336* (2006.01)
*C09J 123/08* (2006.01)
*C09J 177/00* (2006.01)
*C09J 11/06* (2006.01)
*C09K 3/10* (2006.01)
*C08K 5/103* (2006.01)

(52) U.S. Cl.
CPC .............. *C08K 5/01* (2013.01); *C08G 65/336* (2013.01); *C08K 5/101* (2013.01); *C09D 5/34* (2013.01); *C09J 11/06* (2013.01); *C09J 123/0853* (2013.01); *C09J 177/00* (2013.01); *C09K 3/1006* (2013.01); *C08K 5/103* (2013.01)

(58) Field of Classification Search
CPC ....................................................... C08K 5/101
See application file for complete search history.

(56) References Cited

U.S. PATENT DOCUMENTS

| 4,634,629 A * | 1/1987 | Inaba ............ B41J 29/373 400/696 |
| 7,071,150 B2 | 7/2006 | Genuyt et al. |
| 8,715,796 B2 | 5/2014 | Maziers |
| 2001/0044486 A1* | 11/2001 | Wesch ............ B60R 13/08 524/287 |
| 2008/0139713 A1 | 6/2008 | Lee et al. |
| 2011/0319539 A1 | 12/2011 | Westelynck |
| 2014/0170356 A1 | 6/2014 | Maziers |

FOREIGN PATENT DOCUMENTS

| FR | 2910477 A1 | 6/2008 |
| FR | 02910477 A1 | 6/2008 |
| JP | S52052957 A | 4/1977 |
| JP | S60189477 A | 9/1985 |
| JP | H07242783 A | 9/1995 |
| JP | H09194660 A | 7/1997 |
| JP | H10310671 A | 11/1998 |
| JP | H10310672 A | 11/1998 |
| JP | 2000319468 A | 11/2000 |
| WO | WO-9628505 A1 | 9/1996 |
| WO | WO-01083640 A1 | 11/2001 |
| WO | WO-2006062366 A1 | 6/2006 |
| WO | WO-2007/006489 A1 | 1/2007 |
| WO | WO-2010103244 A1 | 9/2010 |
| WO | WO-2012061606 A1 | 5/2012 |
| WO | WO-2013055961 A1 | 4/2013 |

OTHER PUBLICATIONS

Paraffin Wax Safety Data Sheet, Sigma-Aldrich, May 27, 2016.*
Office Action dated May 18, 2018 by the Japanese Patent Office for corresponding Japanese Application No. 2016-541910, and an English Translation of the Office Action (16 pages).

* cited by examiner

*Primary Examiner* — Michael F Pepitone
(74) *Attorney, Agent, or Firm* — Harness, Dickey & Pierce, PLC

(57) ABSTRACT

A plasticizer composition for mastics, plastisols and adhesives is disclosed. The plasticizer includes at least one hydrocarbon-containing cut or a cut originating from biomass conversion and at least one fatty acid monoester. The plasticizer is free of phthalates.

29 Claims, No Drawings ized material, it performs well with regard to certain properties such as flexibility, resistance to impact, cold, heat and has good electrical resistivity. It does not become oxidized and remains non toxic, odourless, colourless and inexpensive.
PLASTICISER FOR SEALANTS, PLASTISOLS AND ADHESIVES

CROSS-REFERENCE TO RELATED APPLICATIONS

This application is a National Phase Entry of International Patent Application No. PCT/EP2014/069160, filed on Sep. 9, 2014, which claims priority to French Patent Application Serial No. 13 58 730, filed on Sep. 11, 2013, both of which are incorporated by reference herein.

FIELD

The invention relates to a composition of hydrocarbon-containing fluids that can be used as a plasticizer in the formulation of mastics, plastisols and adhesives. The present invention relates to a plasticizer without phthalates, with a low content of volatile organic compounds (or VOCs) and also partly comprising compounds of renewable origin. The present invention also relates to the use of said composition for the formulation of mastics, plastisols and adhesives.

BACKGROUND

Numerous products are used in construction materials, for example for floor coverings, mastics or also sanitary seals. The addition of plasticizers is common in certain families of mastics such as the hybrid mastics (based on silyl modified polymers), acrylic mastics, polyurethane mastics, plastisols (PVC paste) and certain adhesives. A plasticizer is a molecule or an oligomer, in the solid state or in the more or less viscous liquid state, added to the formulations of different types of materials in order to make them more flexible, more resistant, more resilient or easier to handle.

An ideal plasticizer is compatible with the polymer matrix in order to prevent migration phenomena, has low volatility, can be extracted only with difficulty by the liquids that will be in contact with the plasticized material, it performs well with regard to certain properties such as flexibility, resistance to impact, cold, heat and has good electrical resistivity. It does not become oxidized and remains non toxic, odourless, colourless and inexpensive.

The phthalates are products very commonly used as a plasticizer. But the pressure of increasingly stringent regulations restricts their uses in many countries due to their danger to human health. Alternatives to their use are now therefore necessary and much sought after.

On the other hand, recent regulatory constraints imposed by limitations on volatile organic compounds or VOCs in construction materials are also to be taken into account. In fact, these compounds have a tendency to evaporate and/or degrade either immediately or over time and to be a source of emissions that are often toxic to the environment and more particularly to human and animal health. These emissions effecting everyday life constitute a significant source of pollution inside homes, offices and administrative buildings and any closed space with limited ventilation. These emissions may be greatest when the materials are applied, but there may also be a longer term effect due to residual volatility over time or even linked to the gradual degradation of the covering or of the adhesive or mastic composition.

Hydrocarbon-containing fluids of the gas oil, kerosene or white spirit type can also be used as a secondary plasticizer in different formulations including polymers or resins. This is the case for the mastics or PVC pastes. But their use is now limited by their lower compatibility in the polymer compared with phthalates. Phenomena of surface migration, bleeding, and surface appearance defects that have been noted prevent the production of formulae without phthalates containing only hydrocarbon-containing fluids.

Due to the increasing regulatory constraints, a technical solution is required in order to allow the replacement of the phthalates in stable and economically advantageous formulations of construction materials with a low VOC content. One of the main objectives of the applicant is therefore to propose a composition that can be used as a phthalate-free plasticizer, for the formulation of construction materials and materials intended for the automotive sector such as mastics, plastisols or certain types of adhesives. Another of the objectives of the applicant is to obtain a composition that can be used as a plasticizer with non VOC properties, for the formulation of construction materials, materials based on resins or materials used in the automotive sector such as mastics, plastisols or certain types of adhesives.

Another objective of the applicant is to propose a composition that can be used as a plasticizer compatible with use for the formulation of mastics, plastisols and adhesives. Another objective of the applicant is to propose a composition that can be used as a plasticizer allowing the formulation of mastics, plastisols and adhesives having satisfactory hardening, in particular according to the standard DIN ISO 7619 (for mastics). Another objective of the applicant is to propose a composition that can be used as a plasticizer allowing the formulation of mastics, plastisols and adhesives which exhibit no bleeding.

Another objective of the applicant is to propose a composition that can be used as a plasticizer allowing the formulation of mastics, plastisols and adhesives having satisfactory drying, i.e. drying in less than 24 hours for a film with a thickness of 2 mm. Another objective of the applicant is to propose a composition that can be used as a plasticizer allowing the formulation of mastics, plastisols and adhesives having a suitable viscosity, i.e. a viscosity comprised between 2,000 and 8,000 Pa·s. Another objective of the applicant is to propose a composition that can be used as a plasticizer allowing the formulation of mastics, plastisols and adhesives having a satisfactory skin formation time, i.e. a skin formation time at ambient temperature comprised between 5 and 45 minutes.

Another objective of the applicant is to propose a composition that can be used as a plasticizer allowing the formulation of mastics, plastisols and adhesives having a good shear resistance according to the standard DIN EN 14293 (for mastics). Another objective of the applicant is to propose a composition that can be used as a plasticizer allowing the formulation of mastics, plastisols and adhesives having a suitable modulus of elasticity according to the standard DIN 53504 or according to the standard DIN 52455-1 (for mastics). Another objective of the applicant is to propose a composition that can be used as a plasticizer allowing the formulation of mastics, plastisols and adhesives having good tensile strength according to the standard DIN 53504 (for mastics). Another objective of the applicant is to propose a composition that can be used as a plasticizer allowing the formulation of mastics, plastisols and adhesives having satisfactory elongation at break according to the standard DIN 53504 (for mastics). Another objective of the applicant is to propose a composition that can be used as a plasticizer allowing the formulation of mastics, plastisols and adhesives having a satisfactory elastic recovery according to the standard DIN EN ISO 7389 (for mastics).

SUMMARY

The invention relates to a plasticizer for mastics, plastisols, and adhesives comprising:

a) at least one hydrocarbon-containing cut or a cut originating from biomass conversion, and
b) at least one fatty acid monoester.

Preferably, the invention relates to a plasticizer for mastics, plastisols, and adhesives comprising:
a) at least one hydrocarbon-containing cut and
b) at least one fatty acid monoester.

Preferably, the hydrocarbon-containing cut is a hydrotreated, hydrocracked or catalytically cracked hydrocarbon-containing cut. Preferably, the hydrocarbon-containing cut is a de-aromatized and optionally desulphurized hydrocarbon-containing cut. Preferably, the hydrocarbon-containing cut has a boiling point comprised between 230 and 400° C.

Preferably, the hydrocarbon-containing cut has a kinematic viscosity at 40° C. comprised between 2 and 22 mm$^2$/s according to the standard ASTM D445. Preferably, the hydrocarbon-containing cut has a pour point ranging from −50 to +10° C. according to the standard ASTM D97. Preferably, the hydrocarbon-containing cut has a content of aromatic compounds measured by UV less than 300 ppm, preferably less than 200 ppm and even more preferably less than 100 ppm.

Preferably, the fatty acid monoester is a C14-18 fatty acid methyl ester. Preferably, the mass ratio of the fatty acid monoester to the hydrocarbon-containing cut or the cut originating from biomass conversion is comprised between 5:95 and 75:25, preferably between 10:90 and 60:40, more preferably between 20:80 and 45:55, even more preferably between 30:70 and 40:60. Preferably, the plasticizer comprises less than 1% by weight of phthalates.

A subject of the invention is also a composition comprising:
at least one polymer selected from the group consisting of a polyether comprising two silane-type terminal functions, a polyurethane comprising two silane-type terminal functions, a polyvinyl chloride, an ethylene-vinyl acetate copolymer, a polyethylene, a polypropylene, a polyamide or a mixture thereof;
the plasticizer as described above;
at least one compound selected from the group consisting of a thickener, a filler, a cross-linking agent, a cross-linking catalyst and a tackifier resin, or a mixture thereof.

According to an embodiment, said composition comprises from 10 to 50% by weight of said polymer, preferably from 20 to 30%. According to an embodiment, said composition comprises from 10 to 30% by weight of plasticizer, preferably from 10 to 25%.

According to an embodiment, the composition is a mastic composition comprising:
at least one polymer selected from the group consisting of a polyether comprising two silane-type terminal functions, a polyurethane comprising two silane-type terminal functions, or a mixture thereof;
the plasticizer as described above;
and at least one cross-linking agent.

According to an embodiment, the composition is a plastisol composition comprising:
at least one polymer selected from the group consisting of a polyvinyl chloride or an ethylene-vinyl acetate copolymer,
the plasticizer as described above,
a filler.

According to an embodiment, the composition is an adhesive composition comprising:

at least one polymer consisting of a polyethylene, a polypropylene or a polyamide,
an ethylene-vinyl acetate copolymer,
the plasticizer as described above,
a tackifier resin.

The invention finally relates to the use of the plasticizer as described above in mastics, plastisols or adhesives.

DETAILED DESCRIPTION

The plasticizer according to the invention comprises at least one hydrocarbon-containing cut or a cut originating from biomass conversion. Preferably, the plasticizer according to the invention comprises at least one hydrocarbon-containing cut. By hydrocarbon-containing cut according to the invention, is meant a cut originating from the distillation of crude oil, preferably originating from the atmospheric distillation and/or vacuum distillation of crude oil, preferably originating from atmospheric distillation followed by vacuum distillation.

The hydrocarbon-containing cut according to the invention is also preferably subjected to stages of hydrotreatment, hydrocracking or catalytic cracking. The hydrocarbon-containing cut according to the invention is also preferably subjected to stages of de-aromatization and optionally desulphurization. The hydrocarbon-containing cut according to the invention can also preferably be subjected to a stage of hydrodewaxing.

Preferably, the feedstock obtained after the distillation stage or stages is a gas oil feedstock, this gas oil feedstock being subjected to the stages of hydrotreatment, hydrocracking, catalytic cracking or hydrodewaxing, optionally followed by stages of de-aromatization and optionally of desulphurization. The hydrocarbon-containing cut can be a mixture of hydrocarbon-containing cuts subjected to the stages described above.

The hydrocarbon-containing cut as described above, has a distillation range DR (in ° C.) such that 230≤DR≤400 and more preferably such that 250≤DR≤380. The hydrocarbon-containing cut can comprise one or more fractions with distillation ranges comprised within that of said cut. The hydrocarbon-containing cut according to the invention generally comprises more than 60% by weight of paraffinic compounds, preferably more than 65%, even more preferably more than 70%.

The hydrocarbon-containing cut according to the invention is generally constituted by a majority of isoparaffins and a minority of normal paraffins. Preferably the hydrocarbon-containing cut contains more than 50% by weight of isoparaffins and less than 20% by weight of normal paraffins. The hydrocarbon-containing cut according to the invention generally comprises less than 50% by weight of naphthenic compounds, preferably less than 40%, even more preferably less than 30%.

The hydrocarbon-containing cut according to the invention is preferably free of aromatics. By "free" is meant, preferably, a hydrocarbon-containing cut comprising less than 300 ppm of aromatics, preferably less than 200 ppm, even more preferably less than 100 ppm measured by UV spectrometry.

Preferably, the hydrocarbon-containing cut according to the invention, has a sulphur content less than 10 ppm and preferably less than 2 ppm. The hydrocarbon-containing cut according to the invention generally has a kinematic viscosity at 40° C. comprised between 2 and 22 mm$^2$/s, preferably between 2 and 15 mm$^2$/s and more preferably between 3 and 13 mm$^2$/s according to the standard ASTM D445. The hydrocarbon-containing cut according to the invention has a pour point according to the standard ASTM D97 comprised between −50 and +10° C., preferably comprised between −40 and 0° C., even more preferably comprised between −30 and −10° C.

The cut originating from biomass conversion can be produced from biological raw materials selected from the group consisting of vegetable oils, animal fats, fish oils and mixtures thereof. The appropriate biological raw materials comprise the following: oil from oilseed rape, canola oil, rapeseed oil, tall oil, sunflower oil, soya oil, hemp oil, olive oil, linseed oil, mustard oil, palm oil, groundnut oil, castor oil, coconut oil, animal fats such as pig fat, tallow or flare fat, recycled edible fats, raw materials originating from genetic engineering and biological raw materials produced by microorganisms such as algae and bacteria. Condensation products, esters or other derivatives obtained from raw biological materials can also serve as raw materials.

A solvent of biological origin is then produced using for example a process which comprises firstly a stage of hydrodeoxygenation (HDO) in order to break down the structure of the constitutive biological esters or triglycerides and in order to remove the compounds containing oxygen, phosphorus and sulphur whilst at the same time producing the hydrogenation of the olefinic bonds. This is followed by isomerization of the product thus obtained leading to the branching of the hydrocarbon chain and to an improvement in the properties of the paraffin at low temperatures. It is for example possible to fractionate the product in order to obtain the desired cuts.

The hydrocarbon-containing cut according to the invention also has the advantage of being easily available on the market, being relatively economical within the chain of oil distillation or biomass conversion products. The plasticizer according to the invention also comprises at least one fatty acid monoester. It is understood that it can also be a mixture of several fatty acids, each of the fatty acids being monoesterified.

The esters of fatty acids are obtained by esterification of free fatty acids or by transesterification of animal and/or vegetable oils (or triglycerides of fatty acids) with an alcohol. During the esterification or transesterification, small quantities of fatty acids may remain in the form of monoglyceride, diglyceride, triglyceride or of fatty acids in the free form. Thus, even if the fatty acid monoester according to the invention is very predominantly in the form of monoester, it can comprise negligible quantities of fatty acids in the form of monoglyceride, diglyceride, triglyceride or in the free form.

The fatty acid monoester according to the invention is in the form of monoester amounting to more than 80% by mass, preferably between 90 and 100%, more preferably between 95 and 98%. The quantities of fatty acids in the form of monoglyceride, diglyceride, triglyceride or in the free form are negligible and represent no more than 15% by mass of the fatty acid monoester according to the invention, preferably no more than 10%, more preferably no more than 6%, even more preferably no more than 4%.

In particular, the fatty acid monoester according to the invention comprises no more than 5% by mass of fatty acids in the form of monoglyceride, preferably no more than 1%. In particular, the fatty acid monoester according to the invention comprises no more than 5% by mass of fatty acids in the form of diglyceride, preferably no more than 2%. In particular, the fatty acid monoester according to the invention comprises no more than 5% by mass of fatty acids in the form of triglyceride, preferably no more than 1%. In particular, the fatty acid monoester according to the invention comprises no more than 6% by mass of fatty acids in the free form, preferably no more than 3%.

The fatty acids of the fatty acid monoester according to the invention, are generally fatty acids comprising from 6 to 24 carbon atoms, preferably from 14 to 22 carbon atoms, more preferably from 16 to 18 carbon atoms, the fatty acids comprising 18 carbon atoms, being the majority of the fatty acids. According to an embodiment, the fatty acid ester is not selected from the glycerol and tall oil fatty acid esters. The fatty acid monoester according to the invention can be a $C_1$-$C_4$ alkyl monoester, such as a methyl monoester, an ethyl monoester, an n-propyl monoester, an i-propyl monoester, an n-butyl monoester, an s-butyl monoester, a t-butyl monoester. Preferably, the monoester is a methyl monoester.

The preferred fatty acid monoester is a fatty acid methyl ester registered under CAS number 67762-26-9. Preferably, the plasticizer according to the invention comprises from 5 to 75% by weight of fatty acid monoester, more preferably from 10 to 60%, even more preferably from 20 to 45%, even more preferably from 30 to 40%. According to an embodiment, the plasticizer comprises from 20 to 60% by weight of fatty acid monoester.

According to an embodiment, the plasticizer comprises from 45 to 75% of a hydrocarbon-containing cut or a cut originating from biomass conversion. Preferably, the plasticizer composition comprises from 25% to 95% by weight of hydrocarbon-containing cut or cut originating from biomass conversion, more preferably from 40 to 90%, even more preferably from 55 to 80%, even more preferably from 60 to 70%. Preferably, the mass ratio of the fatty acid monoester to the hydrocarbon-containing cut or the cut originating from biomass conversion is comprised between 5:95 and 75:25, preferably between 10:90 and 60:40, more preferably between 20:80 and 45:55, even more preferably between 30:70 and 40:60.

The plasticizer according to the invention is free of phthalate-type compounds. By "free" according to the invention, is meant a plasticizer comprising less than 1% by mass of phthalates, relative to the mass of plasticizer, preferably less than 0.5%, more preferably less than 0.1%, even more preferably less than 0.01%. The plasticizer according to the invention generally has a kinematic viscosity at 40° C. ranging from 5 to 22 mm$^2$/s, preferably ranging from 5 to 15 mm$^2$/s according to the standard ASTM D445.

The invention also relates to a mastic composition comprising at least one polymer selected from the group consisting of a polyether comprising two silane-type terminal functions, a polyurethane comprising two silane-type terminal functions, or a mixture thereof, the plasticizer composition as described above and at least one cross-linking agent. Preferably, the polymer is a polyether comprising two silane-type terminal functions. Advantageously the mastic composition comprises from 10 to 50% by weight of said polymer, preferably from 20 to 30%. Advantageously the mastic composition comprises from 10 to 30% by weight of said plasticizer composition, preferably from 10 to 25%. In order to satisfy the mechanical and physico-chemical requirements, the mastic composition also comprises in a standard manner at least one thickener, filler, cross-linking agent and/or catalyst.

The invention also relates to a plastisol composition comprising at least one polymer selected from the group consisting of a polyvinyl chloride and an ethylene-vinyl acetate or EVA the plasticizer composition as described above and a filler. A subject of the invention is also an adhesive composition, preferably a thermoplastic adhesive composition, comprising at least one polymer consisting of a polyethylene, a polypropylene or a polyamide, an ethylene-vinyl acetate copolymer, the plasticizer composition according to the above description and a tackifier resin.

The compositions of mastics, plastisols and adhesives according to the invention have the remarkable characteristic of containing less than 0.1% by weight of phthalates relative to the mass of the composition, preferably less than 0.05%, more preferably less than 0.01%, even more preferably less than 0.001%. The compositions of thermoplastic mastics, plastisols and adhesives as described are without phthalates and with a low VOC content in order to satisfy the current regulatory requirements. Finally, a subject of the invention is the use of the plasticizer composition according to the invention in mastics, plastisols and adhesives.

EXAMPLES

In the remainder of the present description, examples of the present invention are given by way of illustration and are in no case intended to limit its scope.

Different hybrid mastic formulations based on silyl modified polymers (or SMPs) were assessed. These SMP mastics include the ST-PE (Silane terminated Polyether) and ST-PU (Silane terminated Polyurethane) product families. The following examples describe the SMP mastic compositions comprising the different plasticizers below:

- a hydrocracked hydrocarbon-containing cut such as the HYDROSEAL G3H or HYDROSEAL G400H marketed by TOTAL FLUIDES, comparative example 1,
- a hydrodewaxed hydrocarbon-containing cut such as the HYDROSEAL G340H marketed by TOTAL FLUIDES, comparative example 2,
- di-isodecyl phthalate (or DIDP) as a reference for the phthalates, comparative example 3,
- a mixture of fatty acid methyl esters (FAMEs) +HYDROSEAL G3H or HYDROSEAL G340H or HYDROSEAL G400H, examples according to the invention 4, 5, 6 and 7 in different proportions.

Table 1 summarizes the chemical characteristics of the ST-PE mastic used for the different evaluations.

TABLE 1

| Formulation | % by mass | Chemical Nature/Properties |
|---|---|---|
| Polymer MS 203H | 15 | ST-PE/Polymer |
| Polymer MS 303H | 10 | ST-PE/Polymer |
| Plasticizer | 17 | Cf. mixtures described in Table 2 below |
| Crayvallac SLX | 4.5 | PA-wax/thickener |
| Carbital 110S | 51.1 | Chalk/filler |
| SLX Activation; T > 70° C. | | |
| Cooling to T < 40° C. | | |
| Dynasilan VTMO | 0.8 | Vinyltrimethoxysilane/drying agent |
| Drying of the additives for 1 hour | | |
| Dynasilan AMMO | 1.1 | 3-Aminopropylmethoxysilane/cross-linking agent |
| Cooling down to T < 30° C., Cross-linking over 30 minutes | | |
| TIB Kat 223 | 0.3 | Dioctyltindiethanolate/Catalyst |
| Catalyst TIB Kat 422 | 0.2 | Dioctyltin-silane-blend/Catalyst |

Table 2 summarizes the results obtained for the different mastic formulations.

TABLE 2

| Example | Plasticizer | Plasticizer constituents ratio | Hardening[1] | Bleeding[2] | Surface Appearance[3] |
|---|---|---|---|---|---|
| 1 comparative | 17% HYDROSEAL G3H | — | ok | yes (3 d) | dry |
| 2 comparative | 17% HYDROSEAL G340H | — | ok | yes, strong after 1 day (1 d) | wet |
| 3 comparative | 17% DIDP | — | ok | no | dry |
| 4 | 8.5% EMAG/8.5% HYDROSEAL G340H | 50/50 | ok | no | dry |
| 5 | 8% EMAG/9% HYDROSEAL G340H | 47/53 | ok | no | dry |
| 6 | 5% EMAG/12% HYDROSEAL G3H | 29/71 | ok | no | dry |
| 7 | 7% EMAG/10% HYDROSEAL G400H | 41/59 | ok | no | dry |

[1] The hardening of the mastic is assessed by touch 24 hours after its application.
[2] In order to assess bleeding, the mastic is applied to an Exacompta 13308E-type index card. After hardening, the card is checked periodically in order to see whether the oil migrates towards the index card.
[3] The mastic surface moisture is assessed visually.

The results of Table 2 show that the properties of the mastic composition are all just as good or even better with a plasticizer comprising a hydrocarbon-containing fluid mixed with a fatty acid monoester. The hardening of the mastic is satisfactory, no moisture and no bleeding are noted.

Table 3 contains the results obtained for other mastic formulations with the phthalates reference as plasticizer (comparative Example 1a) and a plasticizer according to the invention (Example 8 according to the invention). The formulation of Example 1a contains 17% of a plasticizer which is Jayflex DIDP. The formulation of Example 8 contains 17% of a plasticizer which is a mixture of Hydroseal G340H and fatty acid methyl esters (FAMEs). The percentages by mass of Hydroseal G340H and fatty acid methyl esters (FAMEs) are 8% and 9% respectively, with respect to the mass of the formulation.

TABLE 3

|  | Chemical nature/Properties | Example 1a DIDP composition (in % by mass) | Example 8 EMAG/Hydroseal G340H composition (in % by mass) |
|---|---|---|---|
| Polymer MS 203H | Polyether with silane-type terminal functions/Polymer | 15 | 15 |
| Polymer MS 303H | Polyether with silane-type terminal functions/Polymer | 10 | 10 |
| Irganox 1076 | sterically hindered phenolic anti-oxidant | 0.2 | 0.2 |
| Jayflex DIDP | Di-isodecyl phthalate/Plasticizer | 17 | — |
| Hydroseal G340H | Hydroseal/Plasticizer | — | 8 |
| EMAG | Fatty acid methyl ester/Plasticizer | — | 9 |
| Crayvallac SLX | PA-wax/thickener | 5.5 | 5.5 |
| Carbital 110S | Chalk/filler | 49.9 | 49.9 |
| Dynasilan VTMO | Vinyltrimethoxysilane/drying agent | 0.8 | 0.8 |
| Dynasilan AMMO | 3-Aminopropylmethoxysilane/cross-linking agent | 1.1 | 1.1 |
| Tegokat 223 | Dioctyltindiethanolate/Catalyst | 0.3 | 0.3 |
| Tegokat 422 | Dioctyltin-silane-blend/Catalyst | 0.2 | 0.2 |
|  | TOTAL | 100 | 100 |

TABLE 4

Mechanical properties

| Characteristics | Example 1a DIDP | Example 8 EMAG/G340H |
|---|---|---|
| Viscosity after 0 day/56 day (in Pa · s) (Internal method) | 6150/4800 | 4650/3450 |
| Skin-formation time (smoothing time) after 0 day/56 days (in min) (Internal method) | 8/10 | 13/14 |
| Shore A hardness after 28 days at ambient temperature (DIN ISO 7619) | 28 | 28 |
| Shear strength (application of the mastic to a wooden substrate) EN 281 after 3 days (in N/mm$^2$) (DIN EN 14293) | 0.795 | 0.717 |
| Shear strength (application of the mastic to a wooden substrate) EN 281 after 3 days (in mm) (DIN EN 14293) | 2.0 | 0.9 |
| Elasticity modulus at 100% (2 mm film) 3 days/28 days (in N/mm$^2$) (DIN 53504, S2) | 0.44/0.46 | 0.33/0.40 |
| Tensile strength (2 mm film) 3 days/28 days (in N/mm$^2$) (DIN 53504, S2) | 1.13/1.16 | 0.92/1.10 |
| Elongation at break at 3 days/28 days (in %) (DIN 53504, S2) | 1150/1150 | 1050/1000 |
| Elasticity modulus at 100% (cement cycle A) at ambient temperature (in N/mm$^2$) (DIN 52455-1) | 0.536 | 0.527 |
| Elasticity modulus at 100% (aluminium cycle A) at ambient temperature (in N/mm$^2$) (DIN 52455-1) | 0.518 | 0.494 |
| Elasticity modulus at 100% (cement B) at ambient temperature (in N/mm$^2$) (DIN 52455-1) | 0.461 | 0.461 |
| Elasticity modulus at 100% (cement cycle B) at −20° C. (in N/mm$^2$) (DIN 52455-1) | 0.513 | 0.728 |
| Elasticity modulus at 100% (aluminium cycle B) at ambient temperature (in N/mm$^2$) (DIN 52455-1) | 0.511 | 0.474 |
| Elastic recovery at ambient temperature (in %) (DIN EN ISO 7389-B) | 64 | 78 |

It should be noted that the mechanical properties of the ST-PE mastic containing the composition EMAG/Hydroseal G340H as plasticizer are just as good as or even better than those of a mastic containing DIDP as plasticizer.

The invention claimed is:

1. A composition comprising:
   a) at least one polymer selected from the group consisting of a polyether comprising two silane-type terminal functions, a polyurethane comprising two silane-type terminal functions, an ethylene-vinyl acetate copolymer, a polyethylene, a polypropylene, a polyamide, or a mixture thereof;
   b) a plasticizer comprising:
      i) at least one hydrocarbon-containing cut or a cut originating from a conversion of a biomass, said cuts having a boiling point comprised between 230 and 400° C.;
      ii) at least one fatty acid monoester, the at least one fatty acid monoester comprising a C14-18 fatty acid methyl ester;
      iii) less than 1% by weight of phthalates; and
   c) at least one compound selected from the group consisting of a thickener, a filler, a cross-linking agent, a cross-linking catalyst and a tackifier resin, and mixtures thereof.

2. The composition according to claim 1, in which the plasticizer comprises at least one hydrocarbon-containing cut.

3. The composition according to claim 1, in which the hydrocarbon-containing cut is a hydrotreated, hydrocracked or catalytically cracked hydrocarbon-containing cut.

4. The composition according to claim 1, in which the hydrocarbon-containing cut is a de-aromatized and/or desulphurized hydrocarbon-containing cut.

5. The composition according to claim 1, in which the hydrocarbon-containing cut has a kinematic viscosity at 40° C. comprised between 2 and 22 mm$^2$/s according to the standard ASTM D445.

6. The composition according to claim 1, in which the hydrocarbon-containing cut has a pour point ranging from −50 to +10° C. according to the standard ASTM D97.

7. The composition according to claim 1, in which the hydrocarbon-containing cut has a content of aromatic compounds measured by UV less than 300 ppm.

8. The composition according to claim 1, in which the mass ratio of the fatty acid monoester comprising a C14-C18 fatty acid methyl ester to the hydrocarbon-containing cut or the cut originating from biomass conversion is comprised between 5:95 and 75:25.

9. A composition, which is a mastic composition, comprising:
   a) at least one polymer selected from the group consisting of a polyether comprising two silane-type terminal functions, a polyurethane comprising two silane-type terminal functions, and mixtures thereof; and
   b) a plasticizer comprising:
      i) at least one hydrocarbon-containing cut or a cut originating from a conversion of a biomass, said cuts having a boiling point comprised between 230 and 400° C.;
      ii) at least one fatty acid monoester;
      iii) less than 1% by weight of phthalates; and
   c) at least one cross-linking agent and optionally at least one compound selected from the group consisting of a thickener, a filler, a cross-linking catalyst and a tackifier resin, and mixtures thereof.

10. A composition, which is an adhesive composition, comprising:
   a) i) at least one polypropylene;
      ii) an ethylene-vinyl acetate copolymer; and
   b) a plasticizer comprising:
      i) at least one hydrocarbon-containing cut or a cut originating from a conversion of a biomass, said cuts having a boiling point comprised between 230 and 400° C.;
      ii) at least one fatty acid monoester;
      iii) less than 1% by weight of phthalates; and
   c) a tackifier resin and optionally at least one compound selected from the group consisting of a thickener, a filler, a cross-linking agent and a cross-linking catalyst, and mixtures thereof.

11. The composition according to claim 9, in which the fatty acid monoester is a C14-18 fatty acid methyl ester.

12. The composition according to claim 10, in which the fatty acid monoester is a C14-18 fatty acid methyl ester.

13. The composition according to claim 9, in which the mass ratio of the fatty acid monoester to the hydrocarbon-containing cut or the cut originating from biomass conversion is comprised between 5:95 and 75:25.

14. The composition according to claim 10, in which the mass ratio of the fatty acid monoester to the hydrocarbon-containing cut or the cut originating from biomass conversion is comprised between 5:95 and 75:25.

15. The composition according to claim 9, in which the plasticizer comprises at least one hydrocarbon-containing cut.

16. The composition according to claim 10, in which the plasticizer comprises at least one hydrocarbon-containing cut.

17. The composition according to claim 9, in which the hydrocarbon-containing cut is a hydrotreated, hydrocracked or catalytically cracked hydrocarbon-containing cut.

18. The composition according to claim 10, in which the hydrocarbon-containing cut is a hydrotreated, hydrocracked or catalytically cracked hydrocarbon-containing cut.

19. The composition according to claim 9, in which the hydrocarbon-containing cut is a de-aromatized and/or desulphurized hydrocarbon-containing cut.

20. The composition according to claim 10, in which the hydrocarbon-containing cut is a de-aromatized and/or desulphurized hydrocarbon-containing cut.

21. A composition comprising:
   a) at least one polymer selected from the group consisting of a polyether comprising two silane-type terminal functions, a polyurethane comprising two silane-type terminal functions, an ethylene-vinyl acetate copolymer, a polyethylene, a polypropylene, a polyamide, or a mixture thereof;
   b) a plasticizer comprising:
      i) at least one hydrocarbon-containing cut or a cut originating from a conversion of a biomass, said cuts having a boiling point comprised between 230 and 400° C.;
      ii) at least one fatty acid methyl monoester;
      iii) less than 1% by weight of phthalates; and
   c) at least one compound selected from the group consisting of a thickener, a filler, a cross-linking agent, a cross-linking catalyst and a tackifier resin and mixtures thereof.

22. The composition according to claim 21, in which the plasticizer comprises at least one hydrocarbon-containing cut.

23. The composition according to claim 21, in which the hydrocarbon-containing cut is a hydrotreated, hydrocracked or catalytically cracked hydrocarbon-containing cut.

24. The composition according to claim 21, in which the hydrocarbon-containing cut is a de-aromatized and/or desulphurized hydrocarbon-containing cut.

25. The composition according to claim 21, in which the hydrocarbon-containing cut has a kinematic viscosity at 40° C. comprised between 2 and 22 mm2/s according to the standard ASTM D445.

26. The composition according to claim 21, in which the hydrocarbon-containing cut has a pour point ranging from −50 to +10° C. according to the standard ASTM D97.

27. The composition according to claim 21, in which the hydrocarbon-containing cut has a content of aromatic compounds measured by UV less than 300 ppm.

28. The composition according to claim 21, in which the fatty acid methyl monoester is a C14-18 fatty acid methyl ester.

29. The composition according to claim 21, in which the mass ratio of the fatty acid methyl monoester to the hydrocarbon-containing cut or the cut originating from biomass conversion is comprised between 5:95 and 75:25.

* * * * *